United States Patent
Hwang et al.

(10) Patent No.: US 10,247,977 B2
(45) Date of Patent: Apr. 2, 2019

(54) DISPLAY DEVICE

(71) Applicant: SAMSUNG DISPLAY CO., LTD., Yongin-si, Gyeonggi-do (KR)

(72) Inventors: Jonghak Hwang, Yongin-si (KR); Jangil Kim, Asan-si (KR); Suwan Woo, Suwon-si (KR); Yeogeon Yoon, Suwon-si (KR); Taekyung Yim, Seoul (KR); Joonggun Chong, Yongin-si (KR)

(73) Assignee: Samsung Display Co., Ltd. (KR)

( * ) Notice: Subject to any disclaimer, the term of this patent is extended or adjusted under 35 U.S.C. 154(b) by 14 days.

(21) Appl. No.: 15/639,659

(22) Filed: Jun. 30, 2017

(65) Prior Publication Data

US 2018/0004036 A1 Jan. 4, 2018

(30) Foreign Application Priority Data

Jun. 30, 2016 (KR) .......................... 10-2016-0082309

(51) Int. Cl.
| | |
|---|---|
| *G02F 1/1335* | (2006.01) |
| *G02F 1/1343* | (2006.01) |
| *G02F 1/1362* | (2006.01) |
| *G02F 1/1368* | (2006.01) |

(52) U.S. Cl.
CPC ...... *G02F 1/133514* (2013.01); *G02F 1/1368* (2013.01); *G02F 1/13624* (2013.01); *G02F 1/133512* (2013.01); *G02F 1/134309* (2013.01); *G02F 1/136286* (2013.01); *G02F 2201/123* (2013.01)

(58) Field of Classification Search
CPC .................... G02F 1/133512; G02F 1/133514
See application file for complete search history.

(56) References Cited

U.S. PATENT DOCUMENTS 6,671,025 B1 * 12/2003 Ikeda ................ G02F 1/133514
349/106
8,325,298 B2 12/2012 Takama et al.
(Continued)

FOREIGN PATENT DOCUMENTS

| KR | 1999-0079891 A | 11/1999 |
|---|---|---|
| KR | 10-2010-0090186 A | 8/2010 |

(Continued)

*Primary Examiner* — Alexander Gross
(74) *Attorney, Agent, or Firm* — Innovation Counsel LLP

(57) ABSTRACT

A display device includes: a substrate; a gate line disposed on the substrate; a data line intersecting the gate line; a plurality of thin film transistors connected to each of the gate line and the data line; a plurality of pixel electrodes connected to each of the plurality of thin film transistors; first-color, second-color and third-color filters, respectively, overlapping the plurality of pixel electrodes; and a light blocking portion disposed between two adjacent pixel electrodes of the plurality of pixel electrodes, wherein the light blocking portion comprises: a first-color layer comprising a substantially same material as that included in the first-color filter; a third-color layer comprising a substantially same material as that included in the third-color filter; and a fourth-color layer overlapping over the first-color and third-color layers and absorbing a light having a wavelength in a range from 540 nm to 680 nm.

20 Claims, 6 Drawing Sheets

(56) References Cited

U.S. PATENT DOCUMENTS

2001/0005245 A1\* 6/2001 Sakamoto ......... G02F 1/136209
　　　　　　　　　　　　　　　　　　　349/106
2013/0258259 A1\* 10/2013 Nakai .................... G02B 5/201
　　　　　　　　　　　　　　　　　　　349/106
2016/0033814 A1　2/2016 Na et al.

FOREIGN PATENT DOCUMENTS

| KR | 10-2014-0081662 A | 7/2014 |
| KR | 10-2016-0015504 A | 2/2016 |

\* cited by examiner

DISPLAY DEVICE

CROSS-REFERENCE TO RELATED APPLICATION

This application claims priority under 35 U.S.C. § 119 to Korean Patent Application No. 10-2016-0082309, filed on Jun. 30, 2016, in the Korean Intellectual Property Office (KIPO); the disclosure of the Korean Patent Application is incorporated by reference herein in its entirety.

BACKGROUND

1. Technical Field

The technical field is related to a display device.

2. Discussion of Related Art

A display device typically has an aperture area and a light blocking area, and a light blocking member is formed at the light blocking area to prevent undesirable reflection of external light or light leakage. In order to simplify the manufacturing process of the display device, rather than forming a separate light blocking member, a plurality of color filters may overlap one another at the light blocking area to prevent light leakage.

However, as compared to a light blocking member, the light blocking effect of overlapping color filters may be insufficient and cannot satisfactorily prevent light leakage.

This background section is intended to provide useful background for understanding the application. The background section may include information that is not known by those skilled in the pertinent art prior to a corresponding effective filing date of the application.

SUMMARY

Embodiments may be directed to a display device without significant undesirable light leakage.

According to an embodiment, a display device may include the following elements: a substrate; a gate line disposed on the substrate; a data line intersecting the gate line; a plurality of thin film transistors connected to each of the gate line and the data line; a plurality of pixel electrodes connected to each of the plurality of thin film transistors; first-color, second-color and third-color filters, respectively, overlapping the plurality of pixel electrodes; and a light blocking portion disposed between two adjacent pixel electrodes of the plurality of pixel electrodes, wherein the light blocking portion comprises: a first-color layer comprising a substantially same material as that included in the first-color filter; a third-color layer comprising a substantially same material as that included in the third-color filter; and a fourth-color layer overlapping over the first-color and third-color layers and absorbing a light having a wavelength in a range from 540 nm to 680 nm.

The first-color filter may be a red color filter, the second-color filter may be a green color filter, and the third-color filter may be a blue color filter.

A sum of a thickness of the first-color layer, a thickness of the third-color layer, and a thickness of the fourth-color layer may be in a range from 3.5 µm to 6.0 µm.

A thickness of the first-color layer may be less than a thickness of the first-color filter.

A thickness of the third-color layer may be in a range from 40% to 90% of a thickness of the first-color layer.

A thickness of the fourth-color layer may be in a range from 40% to 90% of a thickness of the third-color layer.

The display device may include a fourth-color filter, which may be positioned on the third-color filter. The fourth-color filter may include a substantially same material as that included in the fourth-color layer.

The display device may include a fourth-color filter, which may be positioned on the third-color filter. A color (and/or a material) of the fourth-color filter may be identical to a color (and/or a material) of the fourth-color layer.

The display device may include an overcoat layer, which may directly contact each of the first-color filter, the second-color filter, and the third-color filter and may directly contact at least one of the first-color layer, the third-color layer, and the fourth-color layer.

The display device may include a liquid crystal layer. The liquid crystal layer may include a first liquid crystal portion and a second liquid crystal portion. The first liquid crystal portion may overlap the plurality of pixel electrodes. The second liquid portion may overlap the fourth-color layer. The first liquid crystal portion may be thicker than the second liquid crystal portion in a direction perpendicular to the plurality of pixel electrodes.

A color of the fourth-color layer may be different from each of the color of the first-color filter, a color of the second-color filter, and the color of the third-color filter.

The third-color layer may be directly connected to the third-color filter.

The third-color layer may directly contact the second-color filter.

The third-color layer may be positioned between the first-color layer and the fourth-color layer.

The third-color layer may be wider than the fourth-color layer.

The display device may include two third-color layers. The two third-color layers may include the third-color layer, may be connected to each other through the third-color filter, may be directly connected to two opposite ends of the third-color filter, respectively, and may overlap two data lines, respectively. The two data lines may include the data line.

The display device may include a fourth-color filter, which may overlap the third-color filter and may be directly connected to the fourth-color layer. A color (and/or a material) of the fourth-color filter may be identical to a color (and/or a material) of the fourth-color layer.

The display device may include two fourth-color layers. The two fourth-color layers may include the fourth-color layer, may be connected to each other through the fourth-color filter, may be directly connected to opposite ends of the fourth-color filter, respectively, and may overlap two data lines, respectively. The two data lines may include the data line.

The display device may include a liquid crystal layer. The fourth-color layer may be positioned between the liquid crystal layer and the data line.

At least one of the first-color layer and the third-color layer may be positioned between the fourth-color layer and the data line.

DETAILED DESCRIPTION

Figure 1:
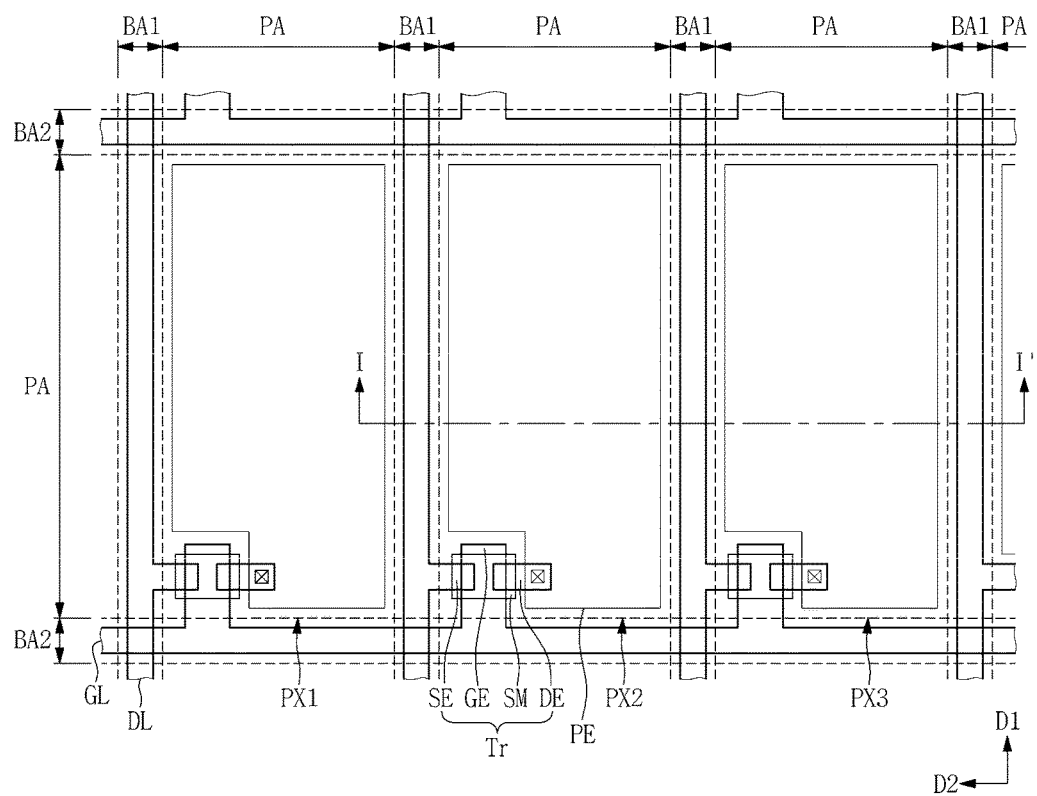
FIG. 1 is a plan view illustrating a display device according to an embodiment.

Example embodiments are described with reference to the accompanying drawings. The described embodiments may be modified in various manners.

Although the terms "first", "second", etc. may be used herein to describe various elements, these elements, should not be limited by these terms. These terms may be used to distinguish one element from another element. Thus, a first element discussed below may be termed a second element without departing from teachings of one or more embodiments. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the drawings, thicknesses of layers and areas may be illustrated in an enlarged manner for clarity and/or ease of description.

When a first element (e.g., a layer, area, or plate) is referred to as being "on" a second element, the first element may be directly on the second element, or one or more intervening elements may be present between the first element and the second element. When a first element is referred to as being "directly on" a second element, no intended intervening layers (except environmental elements such as air) may be present between the first element and the second element.

The spatially relative terms "below", "beneath", "above", "upper", and the like, may be used herein for ease of description to describe the relations between one element and another element illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

The term "connect" may mean "directly connect", "indirectly connect", and/or "electrically connect". The terms "comprises," "comprising," "includes" and/or "including," may specify the presence of stated features, integers, steps, operations, elements, and/or components, but do not preclude the presence or addition of one or more other features, integers, steps, operations, elements, components, etc.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, or 5% of the stated value.

Unless otherwise defined, terms used herein (including technical and scientific terms) have the same meaning as commonly understood by those skilled in the art. Terms, such as those defined in commonly used dictionaries, should be interpreted as having a meaning that is consistent with their meaning in the context of the relevant art and will not be interpreted in an ideal or excessively formal sense unless clearly defined in the present specification.

Like reference numerals may refer to like elements.

The terms "first color", "second color", "third color", and "fourth color" may mean "first-color", "second-color", "third-color", and "fourth-color", respectively.

A display device according to an embodiment may be a liquid crystal display ("LCD") device. Embodiments may be also applicable to organic light emitting diode ("OLED") display devices, for example.

Figure 2:
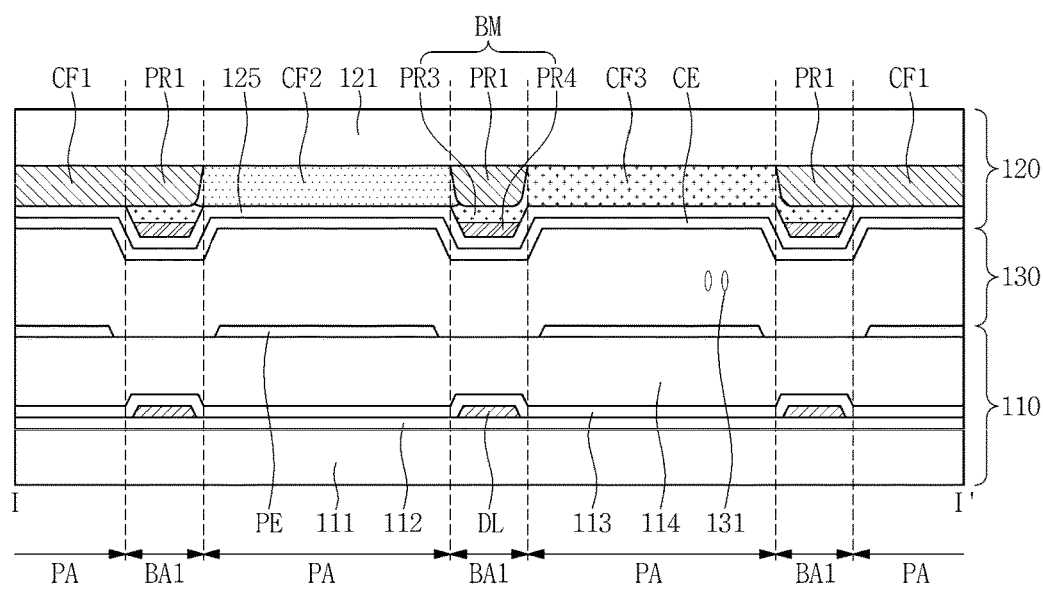
FIG. 2 is a cross-sectional view taken along line I-I' of FIG. 1 according to an embodiment.

FIG. 1 is a plan view illustrating a display device (e.g., an LCD device) according to an embodiment, and FIG. 2 is a cross-sectional view taken along line I-I' of FIG. 1 according to an embodiment.

Referring to FIG. 1, the display device includes a plurality of gate lines GL, a plurality of data lines DL and a plurality of pixels PX1, PX2, and PX3.

The display device includes a first light blocking area BA1 extending in a first direction D1, a second light blocking area BA2 extending in a second direction D2 intersecting the first direction D1 and a pixel area PA defined by the first light blocking area BA1 and the second light blocking area BA2.

Data lines DL are disposed at the first light blocking area BA1 and extend in the first direction D1. Gate lines GL are disposed at the second light blocking area BA2 and extend in the second direction D2. In an embodiment, each of the pixels PX1, PX2, and PX3 is located at a pixel area PA surrounded by two gate lines GL and two data lines DL.

The pixels PX1, PX2 and PX3 include a first pixel PX1, a second pixel PX2 and a third pixel PX3. In an embodiment, the first pixel PX1 is a red pixel for displaying a red image, the second pixel PX2 is a green pixel for displaying a green image, and the third pixel PX3 is a blue pixel for displaying a blue image.

Each of the pixels PX1, PX2 and PX3 includes a thin film transistor Tr and a pixel electrode PE connected to the thin film transistor Tr. Each thin film transistor Tr is connected to a gate line GL and a data line DL.

The pixels PX1, PX2, and PX3 are arranged at a first substrate 111 in the form of a matrix/array having a plurality of columns and a plurality of rows. For example, as illustrated in FIG. 1, the first pixel PX1, the second pixel PX2 and the third pixel PX3 may be arranged along the second direction D2. In embodiments, the pixels PX1, PX2 and PX3 may have V shapes, Z shapes, or other suitable shapes.

Referring to FIGS. 1 and 2, the LCD device includes a lower display panel 110, an upper display panel 120, and a liquid crystal layer 130 disposed between the lower display panel 110 and the upper display panel 120.

The lower display panel 110 includes a first substrate 111, a thin film transistor Tr, a gate insulating layer 112, a first insulating layer 113, a second insulating layer 114 and a pixel electrode PE. In an embodiment, the thin film transistor Tr includes a gate electrode GE, a semiconductor layer SM, a source electrode SE and a drain electrode DE.

The first substrate 111 may be an insulating substrate having light transmitting characteristics and flexible characteristics like a plastic substrate. In embodiments, the first substrate 111 may include a hard substrate such as a glass substrate. The gate electrode GE and the gate line GL are disposed on the first substrate 111.

The gate electrode GE may protrude from the gate line GL toward the pixel electrode PE. The gate electrode GE may be integrated with the gate line GL.

The gate electrodes GE may include or be formed of at least one of the following materials: aluminum (Al) or a related alloy, silver (Ag) or a related alloy, copper (Cu) or a related alloy, and molybdenum (Mo) or a related alloy. In an embodiment, the gate electrode GE may include or be formed of at least one of chromium (Cr), tantalum (Ta), and titanium (Ti). In an embodiment, the gate electrode GE may have a multilayer structure including at least two conductive layers that have different physical properties.

An end portion of the gate line GL may be connected to another layer or an external driving circuit. The end portion of the gate line GL may have a larger area than another portion of the gate line GL. The gate line GL may include a substantially same material and/or may have a substantially same structure (a multilayer structure) as those of the gate electrode GE. The gate line GL and the gate electrode GE may be formed simultaneously in a substantially same process.

The gate insulating layer 112 is disposed on the first substrate 111, the gate electrode GE and the gate line GL. In an embodiment, the gate insulating layer 112 may be located on an entire surface of the first substrate 111 including the gate electrode GE and the gate line GL.

The gate insulating layer 112 may include or be formed of silicon nitride (SiNx) or silicon oxide (SiOx). The gate insulating layer 112 may have a multilayer structure including at least two insulating layers having different physical properties.

The semiconductor layer SM is located on the gate insulating layer 112. As illustrated in FIG. 1, the semiconductor layer SM overlaps at least a portion of the gate electrode GE.

The semiconductor layer SM may include amorphous silicon, polycrystalline silicon, or a different suitable material. In an embodiment, the semiconductor layer SM may include or be formed of one of polycrystalline silicon and an oxide semiconductor such as indium-gallium-zinc oxide (IGZO) and indium-zinc-tin oxide (IZTO).

In an embodiment, an ohmic contact layer may be located on the semiconductor layer SM. The ohmic contact layer may include silicide or n+ hydrogenated amorphous silicon doped with n-type impurity ions, e.g., phosphorus (P), at high concentration. The ohmic contact layers may be disposed on the semiconductor layer SM in pairs.

The source electrode SE is located on the gate insulating layer 112 and the semiconductor layer SM. The source electrode SE overlaps the semiconductor layer SM and the gate electrode GE. The source electrode SE may shape protrude from the data line DL toward the gate electrode GE. The source electrode SE may be integrated with the data line DL. The source electrode SE may be a part of the data line DL.

The source electrode SE may include or be formed of a refractory metal, such as molybdenum, chromium, tantalum and titanium, and/or an alloy. The source electrode SE may have a multilayer structure including a refractory metal layer and a low-resistance conductive layer. Examples of the multilayer structure may include a double-layer structure including a chromium or molybdenum (alloy) lower layer and an aluminum (alloy) upper layer; and a triple-layer structure including a molybdenum (alloy) lower layer, an aluminum (alloy) intermediate layer, and a molybdenum (alloy) upper layer. In an embodiment, the source electrode SE may include or be formed of suitable metals and/or conductors.

The data line DL is disposed on the gate insulating layer 112. An end portion of the data line DL may be connected to another layer or an external driving circuit. The end portion of the data line DL may have a larger area than another portion of the data line DL. The data line DL may include a substantially same material and/or may have a substantially same structure (a multilayer structure) as those of the source electrode SE. The data line DL and the source electrode SE may be formed simultaneously in a substantially same process.

The data line DL intersects the gate line GL. A portion of the data line DL intersecting the gate line GL may have a less line width than a line width of another portion of the data line DL, and a portion of the gate line GL intersecting the data line DL may have a less line width than a line width of another portion of the gate line GL. Accordingly, a parasitic capacitance between the data line DL and the gate line GL may be reduced.

The drain electrode DE is located on the gate insulating layer 112 and the semiconductor layer SM, spaced apart from the source electrode SE at a predetermined distance. The drain electrode DE overlaps the semiconductor layer SM and the gate electrode GE. A channel area of the thin film transistor Tr is located between the drain electrode DE and the source electrode SE.

The drain electrode DE is connected to the pixel electrode PE through a contact hole. The drain electrode DE may include a substantially same material and/or may have a substantially same structure (a multilayer structure) as those of the source electrode SE. The drain electrode DE and the source electrode SE may be formed simultaneously in a substantially same process.

The gate electrode GE, the source electrode SE and the drain electrode DE, together with the semiconductor layer SM, form a thin film transistor (TFT) Tr. In an embodiment, the channel of the TFT Tr is positioned at a portion of the semiconductor layer SM between the source electrode SE and the drain electrode DE.

The first insulating layer 113 may be located on an entire surface of the first substrate 111. The first insulating layer 113 may include silicon nitride (SiNx), silicon oxide (SiOx), or a different suitable material. In embodiments, the first insulating layer 113 may have a multilayer structure including at least two insulating layers having different physical properties. In embodiments, the first insulating layer 113 may have a single-layer structure or a multilayer structure including photosensitive organic materials or low dielectric constant insulating materials such as a-Si:C:O and a-Si:O:F.

The second insulating layer 114 is located on the first insulating layer 113. The second insulating layer 114 may planarize an upper portion of the first insulating layer 113.

The pixel electrode PE is connected to the drain electrode DE through the contact hole. The pixel electrode PE is located on the second insulating layer 114. The pixel electrode PE may include a transparent conductive material such as indium tin oxide (ITO) or indium zinc oxide (IZO). In an embodiment, ITO may be a polycrystalline material or a monocrystalline material, and IZO may also be a polycrystalline material or a monocrystalline material.

The upper display panel 120 includes a second substrate 121, color filters CF1, CF2 and CF3, a light blocking portion BM, an overcoat layer 125 and a common electrode CE.

The second substrate 121 may be an insulating substrate having light transmitting characteristics and flexible characteristics like a plastic substrate. In embodiments, the second substrate 121 may include a hard substrate such as a glass substrate.

The color filters CF1, CF2 and CF3 and the light blocking portion BM are disposed on the second substrate 121.

The color filters CF1, CF2 and CF3 are disposed at the pixel area PA in an area surrounded by the light blocking portion BM. That is, the first color filter CF1, the second color filter CF2 and the second color filter CF2 are disposed corresponding to the pixel electrodes of the first pixel PX1, the second pixel PX2, and the third pixel PX3, respectively, on the second substrate 121.

The first color filter CF1, the second color filter CF2 and the third color filter CF3 according to an embodiment are red, green and blue color filters, respectively.

The color filters CF1, CF2 and CF3 may include photosensitive resins of their respective colors.

The light blocking portion BM is also referred to as a black matrix, and defines a pixel area PA which is an opening area through which light is transmitted.

The light blocking portion BM includes a first color layer PR1, a third color layer PR3 and a fourth color layer PR4.

The first color layer PR1 is disposed on the second substrate 121 and extends from the first color filter CF1. The first color layer PR1 may include a substantially same material and may have a substantially same structure (a multilayer structure) and a substantially same color as those of the first color filter CF1. In other words, the first color layer PR1 and the first color filter CF1 may be formed simultaneously in a substantially same process. Accordingly, the first color layer PR1 may include a substantially same material and may have a substantially same structure (a multilayer structure) as those of the red color filter, and may be formed simultaneously in a substantially same process with the red color filter.

The third color layer PR3 is disposed on the first color layer PR1 and extends from the third color filter CF3. The third color layer PR3 may include a substantially same material and may have a substantially same structure (a multilayer structure) and a substantially same color as those of the third color filter CF3. In other words, the third color layer PR3 and the third color filter CF3 may be formed simultaneously in a substantially same process. Accordingly, the third color layer PR3 may include a substantially same material and may have a substantially same structure (a multilayer structure) as those of the blue color filter, and may be formed simultaneously in a substantially same process with the blue color filter.

The fourth color layer PR4 is disposed on the third color layer PR3 and includes a material that may absorb a light having a wavelength in a range from about 540 nm to about 680 nm. The light blocking portion BM according to an embodiment includes the fourth color layer PR4 that absorbs light in the above wavelength range so that the absorbance may be improved, thus enhancing the light blocking effect of the light blocking portion BM.

A thickness of the first color layer PR1 is substantially equal to a thickness of at least one of the first, second and third color filters CF1, CF2 and CF3. A thickness of the third color layer PR3 is substantially equal to a thickness of the first color layer PR1. A thickness of the third color layer PR3 may be in a range from about 40% to about 90% of the thickness of the first color layer PR1.

A thickness of the fourth color layer PR4 is thinner than the thickness of each of the first, second and third color filters CF1, CF2 and CF3. The thickness of the fourth color layer PR4 may be in a range of about 40% to about 90% of the thickness of the third color layer PR3. According to an embodiment, the thicknesses of the first, third and fourth color layers PR1, PR3 and PR4 are gradually made thinner.

In an embodiment, a thickness of the light blocking portion BM including the first, third and fourth color layers PR1, PR3 and PR4 may be in a range of about 3.5 μm to about 6.0 μm.

The light blocking portion BM according to an embodiment has a structure in which the first color layer PR1, the third color layer PR3 and the fourth color layer PR4 are sequentially stacked in the order listed. In embodiments, the stack order of the first, third and fourth color layers PR1, PR3 and PR4 may be different from the order described above.

The overcoat layer 125 is disposed on the color filters CF1, CF2 and CF3 and the light blocking portion BM. The overcoat layer 125 flattens an uneven surface of the color filters CF1, CF2 and CF3 and the light blocking portion BM, and/or may prevent contamination of related layers.

The common electrode CE may be disposed on the second substrate 121 and may be disposed on an entire surface of the second substrate 121. The common electrode CE may include a transparent conductive material such as indium tin oxide (ITO) or indium zinc oxide (IZO). In an embodiment, ITO may be a polycrystalline material or a monocrystalline material, and IZO may also be a polycrystalline material or a monocrystalline material. The common electrode CE receiving the common voltage, together with the pixel electrode PE receiving the data voltage, generates an electric field over the liquid crystal layer 130 to determine the direction of liquid crystal molecules of the liquid crystal layer 130 and display an image.

The liquid crystal layer 130 is disposed between the lower display panel 110 and the upper display panel 120. The liquid crystal layer 130 may include liquid crystal molecules having negative dielectric anisotropy and aligned vertically. In an embodiment, the liquid crystal layer 130 may include a photopolymerizable material, and such a photopolymerizable material may be a reactive monomer or a reactive mesogen.

A column spacer may be further included between the two display panels 110 and 120. The column spacer may be disposed on the light blocking portion BM of the upper display panel 120 and may be disposed on the lower display panel 110 corresponding to the light blocking portion BM of the upper display panel 120. The liquid crystal layer 300 is interposed in a space between the two display panels 110 and 120 secured by the column spacer.

In an embodiment, an alignment layer is disposed on inner surfaces of the two display panels 110 and 120. The alignment layer may be a vertical alignment layer, or may be a photo alignment layer including photopolymerizable materials.

Figure 3A:
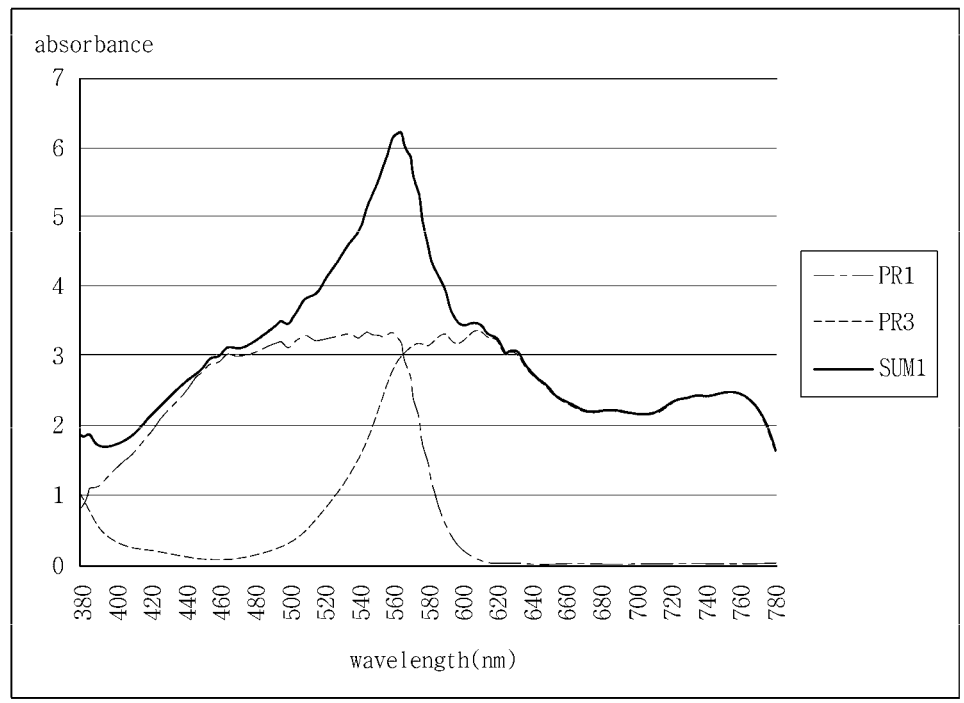
FIG. 3A and FIG. 3B are graphs illustrating absorbance values of a light blocking portion according to wavelength values of light.
Figure 3B:
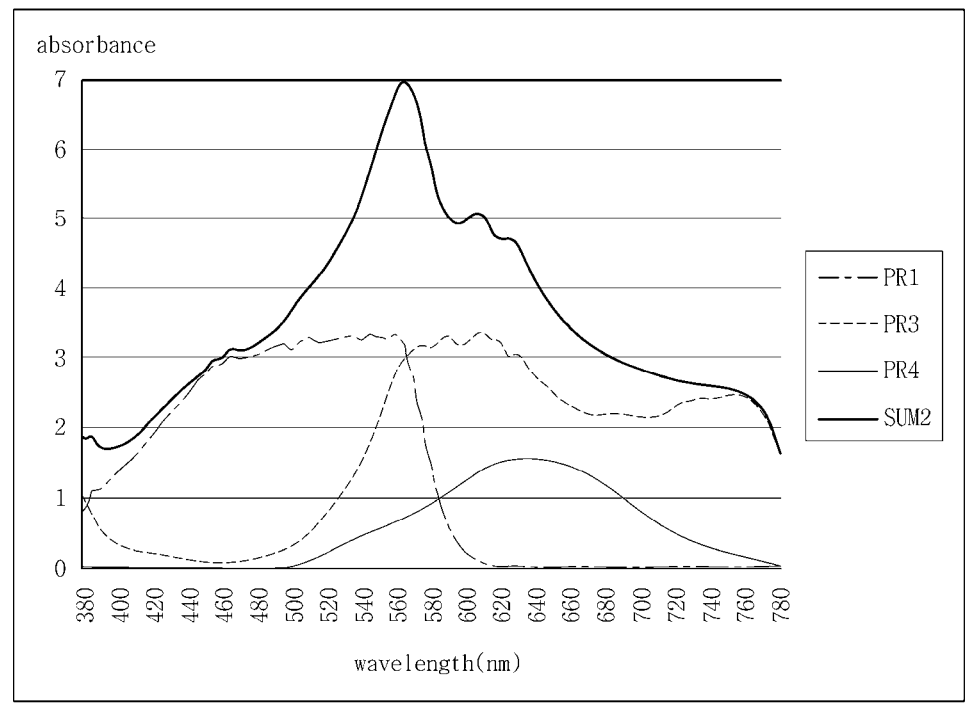

FIG. 3A and FIG. 3B are graphs illustrating absorbance values of the light blocking portion according to wavelength values of light. An X-axis of the graph corresponds to wavelength values, and a Y-axis corresponds to absorbance values of the light blocking portion.

FIG. 3A shows absorbance values SUM1 of the light blocking portion BM when the light blocking portion BM includes only the first color layer PR1 and the third color layer PR3.

FIG. 3B shows absorbance values SUM2 of the light blocking portion BM when the light blocking portion BM further includes the fourth color layer PR4. As can be appreciated from FIG. 3B and FIG. 3A, absorbance of the light blocking portion BM is improved overall in the long wavelength band when the light blocking portion BM further includes the fourth color layer PR4, as compared with the case where the light blocking portion BM includes only the first color layer PR1 and the third color layer PR3. In an embodiment, the absorbance of light having a wavelength in a range from about 540 nm to about 680 nm may be substantially improved.

According to embodiments, the light blocking portion BM including the layer PR4 may perform satisfactory light blocking.

Figure 4:
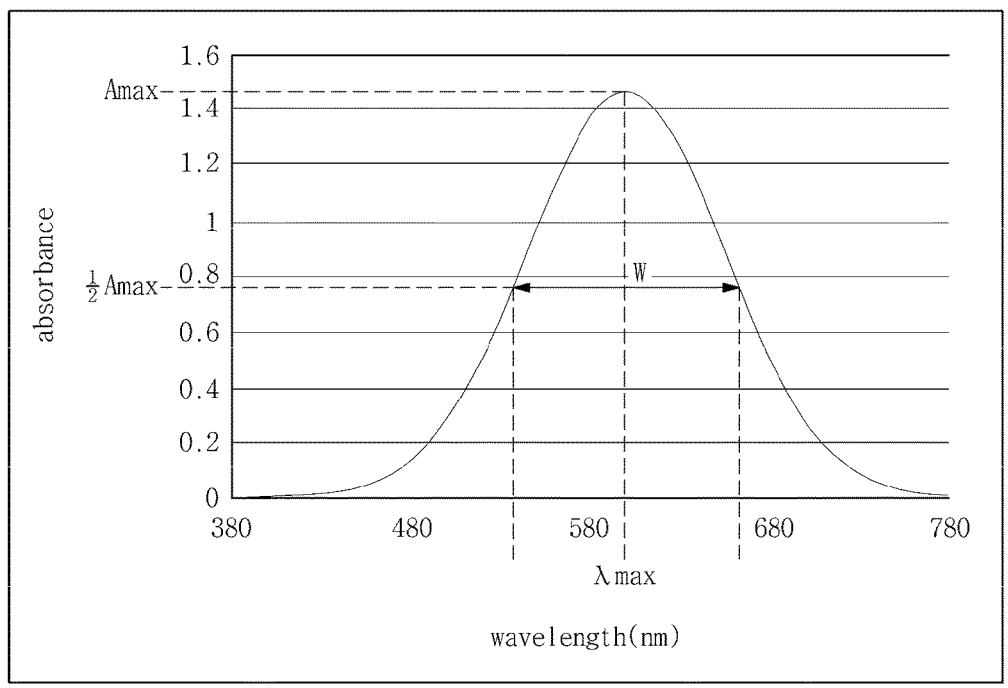
FIG. 4 is a graph illustrating absorbance values of a fourth-color layer according to wavelength values of light.

FIG. 4 is a graph illustrating absorbance values of a fourth color layer according to wavelength values of light. In FIG. 4, corresponding to that the absorbance value of the fourth color layer PR4 is the maximum absorbance value Amax, the corresponding wavelength value is defined as a center wavelength value λmax. In addition, corresponding to that the absorbance values of the fourth color layer PR4 are at least half of the maximum absorbance Amax, or ½ Amax, a range of corresponding wavelength values is defined as a half value width W.

Referring to FIG. 4, the fourth color layer PR4 of the display device according to an embodiment has high absorbance values that are at least ½ Amax for light having a wavelength value in a range from about 540 nm to about 680 nm. The fourth color layer PR4 may be configured to absorb light having a wavelength value in a range from about 540 nm to about 680 nm. In an embodiment, the center wavelength λmax of the fourth color layer PR4 may be about 600 nm.

In an embodiment, the maximum absorbance Amax of the fourth color layer PR4 may have a value in a range from about 1 to about 2. In an embodiment, the maximum absorbance Amax may be about 1.5.

According to embodiments, the light blocking portion BM including the fourth color layer PR4 on the first and third color layers PR1 and PR3 may perform satisfactory light absorbance and light blocking in the long wavelength band.

In an embodiment, the half value width W of the fourth color layer PR4 has a value of about 120 nm or more. As the half value width w increases, light of a wider range of wavelength band can be effectively absorbed, and satisfactory light blocking effect may be implemented.

Figure 5:
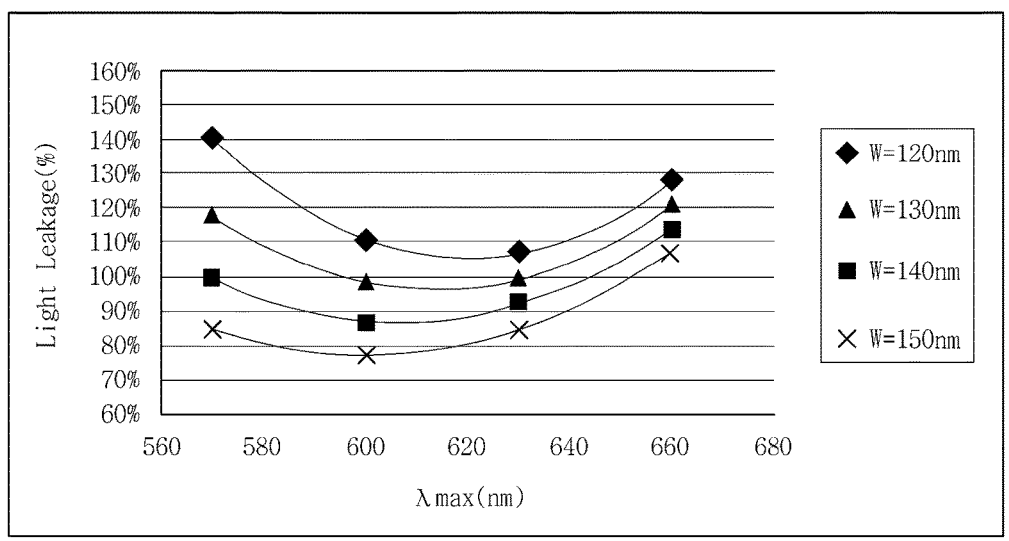
FIG. 5 is a graph illustrating degrees of light leakage of a light blocking portion according to properties of fourth-color layers.

FIG. 5 is a graph illustrating degrees of light leakage of a light blocking portion according to fourth color layers. FIG. 5 illustrates degrees of light leakage of the light blocking portion BM according to center wavelength values λmax and half value widths W of the fourth color layer PR4 in a relative manner, wherein the degree of light leakage of a black matrix with a black column spacer structure is defined as 100%.

Referring to FIG. 5, for the half value widths W 120 nm, 130 nm, 140 nm and 150 nm, degrees of light leakage decrease as the half value widths W increase. For each half value width, light leakage is the minimum when the center wavelength λmax of the fourth color layer PR4 is about 600 nm.

In an embodiment, when the center wavelength λmax of the fourth color layer PR4 is about 600 nm and the half value width W is large, the light leakage is substantially low as compared with the black matrix with the black column spacer, and satisfactory light blocking may be attained.

Figure 6:
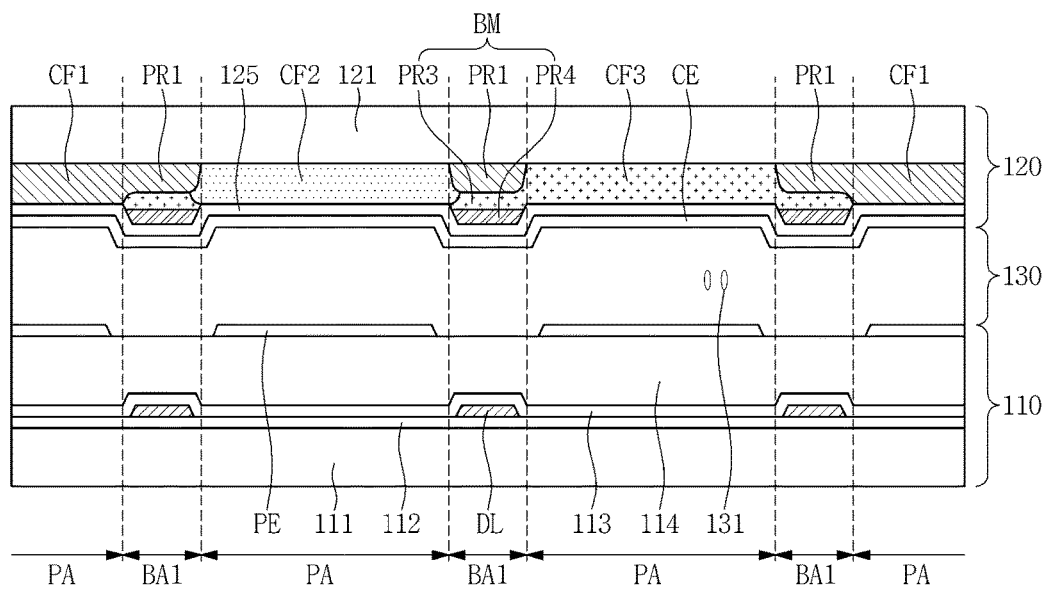
FIG. 6 is a cross-sectional view illustrating a display device according to an embodiment.

FIG. 6 is a cross-sectional view illustrating a display device according to an embodiment. The display device may have one or more of the above-described elements and/or structures.

Referring to FIG. 6, the first color layer PR1 of the display device is thinner than the first color filter CF1 in a direction perpendicular to the pixel electrodes PE.

The first color layer PR1 may include a substantially same material and may have a substantially same structure and color as those of the first color filter CF1, and the first color layer PR1 and the first color filter CF1 may be formed simultaneously in a substantially same process.

For example, in order to form the first color filter CF1 and the first color layer PR1, a photosensitive composition is applied onto the second substrate 121, and an exposure mask (not illustrated) is disposed above the photosensitive composition to expose the photosensitive composition. In an embodiment, the exposure mask may use a three-tone mask including three areas each having different light transmittances. The exposed photosensitive composition is developed with a developer and then cured to form a first color filter CF1 and a first color layer PR1 having different thicknesses.

In an embodiment, the third color layer PR3 is thinner than the first color layer PR1 in the direction perpendicular to the pixel electrodes PE, and the fourth color layer PR4 is thinner than each of the first and third color layers PR1 and PR3 in the direction perpendicular to the pixel electrodes PE. According to an embodiment, the thicknesses of the first, third and fourth color layers PR1, PR3 and PR4 are gradually made thinner.

The display device may be configured such that the light blocking portion BM is substantially thin, and height differences between the pixel area PA of the upper display panel 120 and the light blocking areas BA1 and BA2 may be minimized. This structure may prevent the alignment of liquid crystal molecules 131 from being deformed and thus may prevent light leakage.

Figure 7:
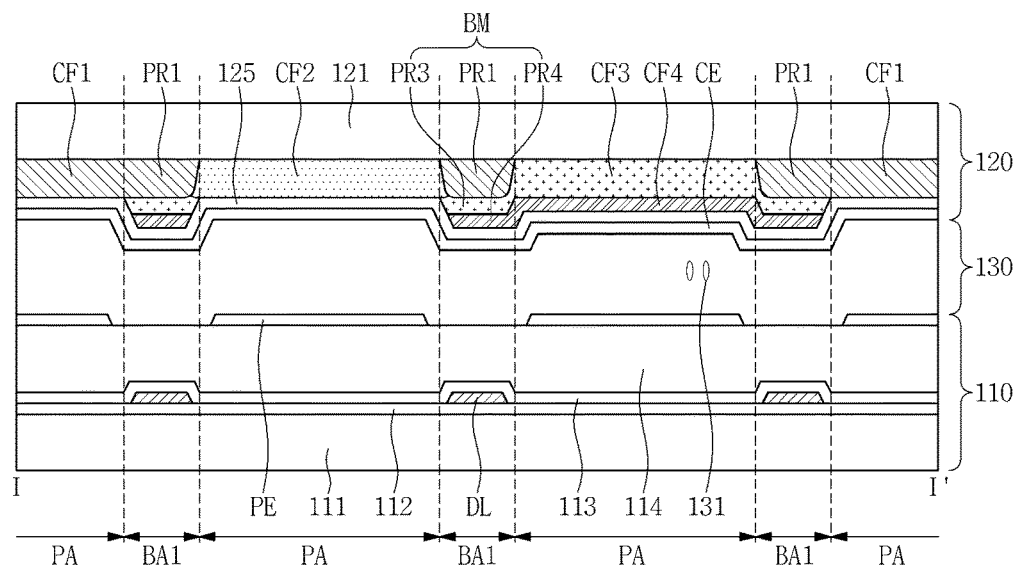
FIG. 7 is a cross-sectional view illustrating a display device according to an embodiment.

FIG. 7 is a cross-sectional view illustrating a display device according to an embodiment. The display device may have one or more of the above-described elements and/or structures.

Referring to FIG. 7, the display device further includes a fourth color filter CF4.

The fourth color filter CF4 is disposed on the third color filter CF3 and extends from the fourth color layer PR4. The fourth color filter CF4 may include a substantially same material and may have a substantially same structure (a multilayer structure) and a substantially same color as those of the fourth color layer PR4. The fourth color filter CF4 and the fourth color layer PR4 may be formed simultaneously in a substantially same process.

Accordingly, the fourth color filter CF4, similar to the fourth color layer PR4, may include a material that may absorb a light having a wavelength in a range from about 540 nm to about 680 nm. That is, the center wavelength λmax of the fourth color filter CF4 may be in a range of about 540 nm to about 680 nm, and the maximum absorbance Amax may have a value in a range from about 1 to about 2.

According to an embodiment, in the manufacturing of the display device, when the fourth color filter CF4 and the fourth color layer PR4 are formed, a mask used to form the third color filter CF3 and the third color layer PR3 may be used. Accordingly, the number of masks used in the manufacturing process may be reduced.

Figure 8:
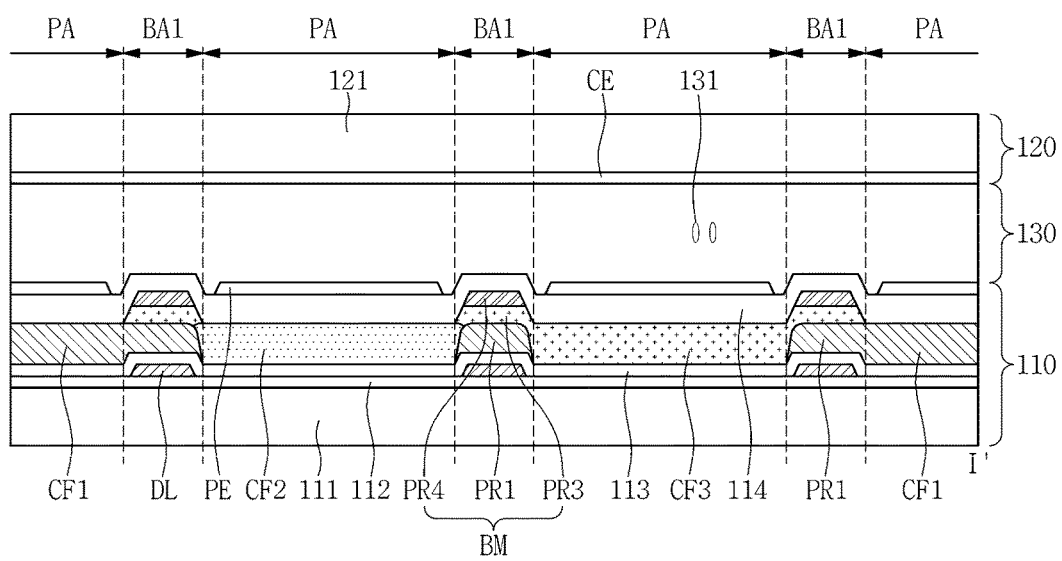
FIG. 8 is a cross-sectional view illustrating a display device according to an embodiment.

FIG. 8 is a cross-sectional view illustrating a display device according to an embodiment. The display device may have one or more of the above-described elements and/or structures.

Referring to FIG. 8, the display device has a color filter on array (COA) structure in which color filters CF1, CF2 and CF3 are disposed on a lower display panel 110.

The color filters CF1, CF2 and CF3 are disposed on the first insulating layer 113. The color filters CF1, CF2 and CF3 may include photosensitive resins. The second insulating layer 114 is disposed on the color filters CF1, CF2 and CF3 and the first insulating layer 113. The second insulating layer 114 may planarize the upper portions of the color filters CF1, CF2 and CF3 and the first insulating layer 113.

In the display device, the thin film transistor Tr and the color filters CF1, CF2 and CF3 are disposed on a substantially same substrate. Accordingly, adhesion failure between the lower display panel 110 and the upper display panel 120 may be minimized and/or prevented, and the manufacturing process of the display device may be simplified.

As set forth hereinabove, embodiments may minimize undesirable light leakage.

While example embodiments have been described, various changes in form and detail may be made to the described embodiments without departing from the spirit and scope defined in the claims.

What is claimed is:

1. A display device comprising:
a substrate;
a gate line disposed on the substrate;
a data line intersecting the gate line;
a plurality of thin film transistors connected to each of the gate line and the data line;
a plurality of pixel electrodes connected to each of the plurality of thin film transistors;
first-color, second-color and third-color filters respectively overlapping the pixel electrodes; and
a light blocking portion disposed between two adjacent pixel electrodes of the plurality of pixel electrodes,
wherein the light blocking portion comprises:
a first-color layer comprising a substantially same material as that included in the first-color filter, wherein the color of the first-color layer is identical to the color of the first-color filter;
a third-color layer comprising a substantially same material as that included in the third-color filter, wherein the color of the third-color layer is identical to the color of the third-color filter; and
a fourth-color layer overlapping over the first-color and third-color layers and absorbing a light having a wavelength in a range from 540 nm to 680 nm, wherein the color of the fourth-color layer is different from each of the color of the first-color filter, the color of the second-color filter, and the color of the third-color filter.

2. The display device of claim 1, wherein the first-color filter is a red color filter, the second-color filter is a green color filter, and the third-color filter is a blue color filter.

3. The display device of claim 1, wherein a sum of a thickness of the first-color layer, a thickness of the third-color layer, and a thickness of the fourth-color layer is in a range from 3.5 μm to 6.0 μm.

4. The display device of claim 1, wherein a thickness of the first-color layer is less than a thickness of the first-color filter.

5. The display device of claim 1, wherein a thickness of the third-color layer is in a range from 40% to 90% of a thickness of the first-color layer.

6. The display device of claim 1, wherein a thickness of the fourth-color layer is in a range from 40% to 90% of a thickness of the third-color layer.

7. The display device of claim 1, further comprising a fourth-color filter, which is positioned on the third-color filter, wherein the fourth-color filter includes a substantially same material as that included in the fourth-color layer.

8. The display device of claim 7, wherein a color of the fourth-color filter is identical to a color of the fourth-color layer.

9. The display device of claim 1, further comprising an overcoat layer, which directly contacts each of the first-color filter, the second-color filter, and the third-color filter and directly contacts at least one of the first-color layer, the third-color layer, and the fourth-color layer.

10. The display device of claim 1, further comprising
a liquid crystal layer, which comprises a first liquid crystal portion and a second liquid crystal portion, wherein the first liquid crystal portion overlaps the plurality of pixel electrodes, wherein the second liquid portion overlaps the fourth-color layer, and wherein the first liquid crystal portion is thicker than the second liquid crystal portion in a direction perpendicular to the plurality of pixel electrodes.

11. The display device of claim 1, wherein a color of the fourth-color layer is different from each of the color of the first-color filter, a color of the second-color filter, and the color of the third-color filter.

12. The display device of claim 1, wherein the third-color layer is directly connected to the third-color filter.

13. The display device of claim 1, wherein the third-color layer directly contacts the second-color filter.

14. The display device of claim 1, wherein the third-color layer is positioned between the first-color layer and the fourth-color layer.

15. The display device of claim 1, wherein the third-color layer is wider than the fourth-color layer.

16. The display device of claim 1, comprising two third-color layers, wherein the two third-color layers include the third-color layer, are connected to each other through the third-color filter, are directly connected to two opposite ends of the third-color filter, respectively, and overlap two data lines, respectively, and wherein the two data lines include the data line.

17. The display device of claim 1, further comprising a fourth-color filter, which overlaps the third-color filter and is directly connected to the fourth-color layer, wherein a color of the fourth-color filter is identical to a color of the fourth-color layer.

18. The display device of claim 17, comprising two fourth-color layers, wherein the two fourth-color layers include the fourth-color layer, are connected to each other through the fourth-color filter, are directly connected to two opposite ends of the fourth-color filter, respectively, and overlap two data lines, respectively, and wherein the two data lines include the data line.

19. The display device of claim 1, further comprising a liquid crystal layer, wherein the fourth-color layer is positioned between the liquid crystal layer and the data line.

20. The display device of claim 1, wherein at least one of the first-color layer and the third-color layer is positioned between the fourth-color layer and the data line.

* * * * *